US011160025B2

(12) United States Patent
Jones, III et al.

(10) Patent No.: US 11,160,025 B2
(45) Date of Patent: Oct. 26, 2021

(54) SYSTEMS AND METHODS FOR RESPONDING TO DEVICE BATTERY POWER DEPLETION DURING A COMMUNICATION

(71) Applicant: T-Mobile USA, Inc., Bellevue, WA (US)

(72) Inventors: Anthony Samuel Jones, III, Kent, WA (US); Bhagwan Singh Khanka, Bothell, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 0 days.

(21) Appl. No.: 16/835,581

(22) Filed: Mar. 31, 2020

(65) Prior Publication Data

US 2021/0306956 A1    Sep. 30, 2021

(51) Int. Cl.
*H04W 52/02* (2009.01)
*G06F 1/3212* (2019.01)
*H04M 3/533* (2006.01)
*H04W 4/14* (2009.01)

(52) U.S. Cl.
CPC ...... *H04W 52/0261* (2013.01); *G06F 1/3212* (2013.01); *H04M 3/533* (2013.01); *H04W 4/14* (2013.01)

(58) Field of Classification Search
CPC .................................................. H04W 52/0261
See application file for complete search history.

(56) References Cited

U.S. PATENT DOCUMENTS

| | | | | |
|---|---|---|---|---|
| 2005/0288007 A1* | 12/2005 | Benco | ................ | G08B 21/0247 455/422.1 |
| 2009/0093281 A1* | 4/2009 | Demirhan | ......... | H04W 52/0235 455/574 |
| 2014/0087705 A1* | 3/2014 | Wooster | .................. | H04M 3/58 455/416 |

* cited by examiner

*Primary Examiner* — Hsinchun Liao
(74) *Attorney, Agent, or Firm* — Loeb & Loeb LLP

(57) ABSTRACT

A computer-implemented method includes establishing a communication link between a first device of a first party and a second device of a second party that allows a communication between the first party and the second party, and periodically receiving a signal from the first device indicating a remaining battery power level of the first device during the communication. The method further includes communicating an alert to the second device over the communication link to notify the second party that the first device is near a battery power loss if the remaining battery power level falls below a predetermined threshold.

19 Claims, 7 Drawing Sheets

SYSTEMS AND METHODS FOR RESPONDING TO DEVICE BATTERY POWER DEPLETION DURING A COMMUNICATION

TECHNICAL FIELD

Embodiments discussed herein generally relate to methods and systems for responding to battery power depletion in a mobile communication device.

BACKGROUND

Communications between parties via computer devices such as mobile devices (e.g., smartphones, tablets, laptops, wearable devices, etc.) are invaluable for many personal and professional purposes. These communications may include voice calls and video calls supported by communication networks including mobile networks, WiFi networks, and the Internet. The communication network is involved in establishing a communication link between the devices of the parties to enable the desired communication. A mobile network includes cell towers in the cells of a divided land area that communicate with a central office, or a mobile telephone switching office (MTSO). The MTSO is involved in a range of functions such as communicating with the mobile device through a control channel, tracking the mobile device's location and activity, determining the frequencies for establishing a call between mobile devices, and communicating with other MTSOs and networks.

While effective, mobile devices are reliant on battery power which may become depleted over time and require recharging through an electrical outlet or another device. Battery power loss of one mobile device during a conversation between parties may cause abrupt disconnection of the call, sometimes in the middle of critical discussions, leaving the parties that were on the call frustrated. Furthermore, the party that has not experienced the battery power loss may be left wondering why the call was terminated and may waste time and network resources by continually trying to call back the other party, only to be sent to the other party's voicemail. Meanwhile, the party that experienced the battery power loss may rush to recharge the battery and call back the other party to explain what happened.

Additionally, the network may not be able to distinguish between drops in connectivity during a call that are due to a poor network connection and those that are due to battery power loss at the mobile device level. Consequently, when one party experiences a battery power loss, the network may perceive the drop in connection and may needlessly perform optimizations to restore the connection, wasting network resources.

Thus, there is a need for strategies for not only extending the life of the battery during a call, but also for providing notifications of an impending battery power loss to the parties on the call and to the network. The embodiments of the present disclosure attempt to provide a technical solution to address these needs.

SUMMARY

Embodiments disclosed herein apply to systems and methods for responding to device battery power depletion during a communication (e.g., a call) between a first party and a second party. In one embodiment, a computer-implemented method for responding to battery power depletion on a first device of a first party during a communication between the first party using the first device and a second party using a second device is disclosed. The method may include detecting a remaining battery power level of the first device using a battery indicator on the first device, and communicating, from the first device, the remaining battery power level to a communication network at least partially controlling the communication between the first party and the second party. The method may further include determining whether the remaining battery power level of the first device is near battery power loss, and communicating, from the communication network, an alert to the second device to notify the second party that the first device is near the battery power loss.

In another embodiment, a communication system is disclosed. The communication system may include a first device of a first party, a second device of a second party, and a communication network configured to establish a communication link between the first device and the second device that allows a communication between the first party and the second party. The first device may at least include a battery, a battery indicator configured to detect a remaining battery power level of the battery, a device processor, a memory, and a communication circuit. The communication network may at least include a network processor, a memory, and a communication circuit. The device processor of the first device may be physically configured according to computer-executable instructions for receiving a signal from the battery indicator indicating a remaining battery power level of the battery, and communicating a signal indicating the remaining battery power level to the communication network during the communication between the first party and the second party. The network processor of the communication network may be physically configured according to computer-executable instructions for receiving the signal indicating the remaining battery power level of the first device from the device processor, determining whether the remaining battery power level of the first device is near battery power loss, and communicating an alert to the second device to notify the second party that the first device is near the battery power loss prior to termination of the communication.

BRIEF DESCRIPTION OF THE DRAWINGS

The disclosure may be better understood by reference to the detailed description when considered in connection with the accompanying drawings. The components in the figures are not necessarily to scale, emphasis instead being placed upon illustrating the principles of the disclosure.

DETAILED DESCRIPTION

Figure 1:
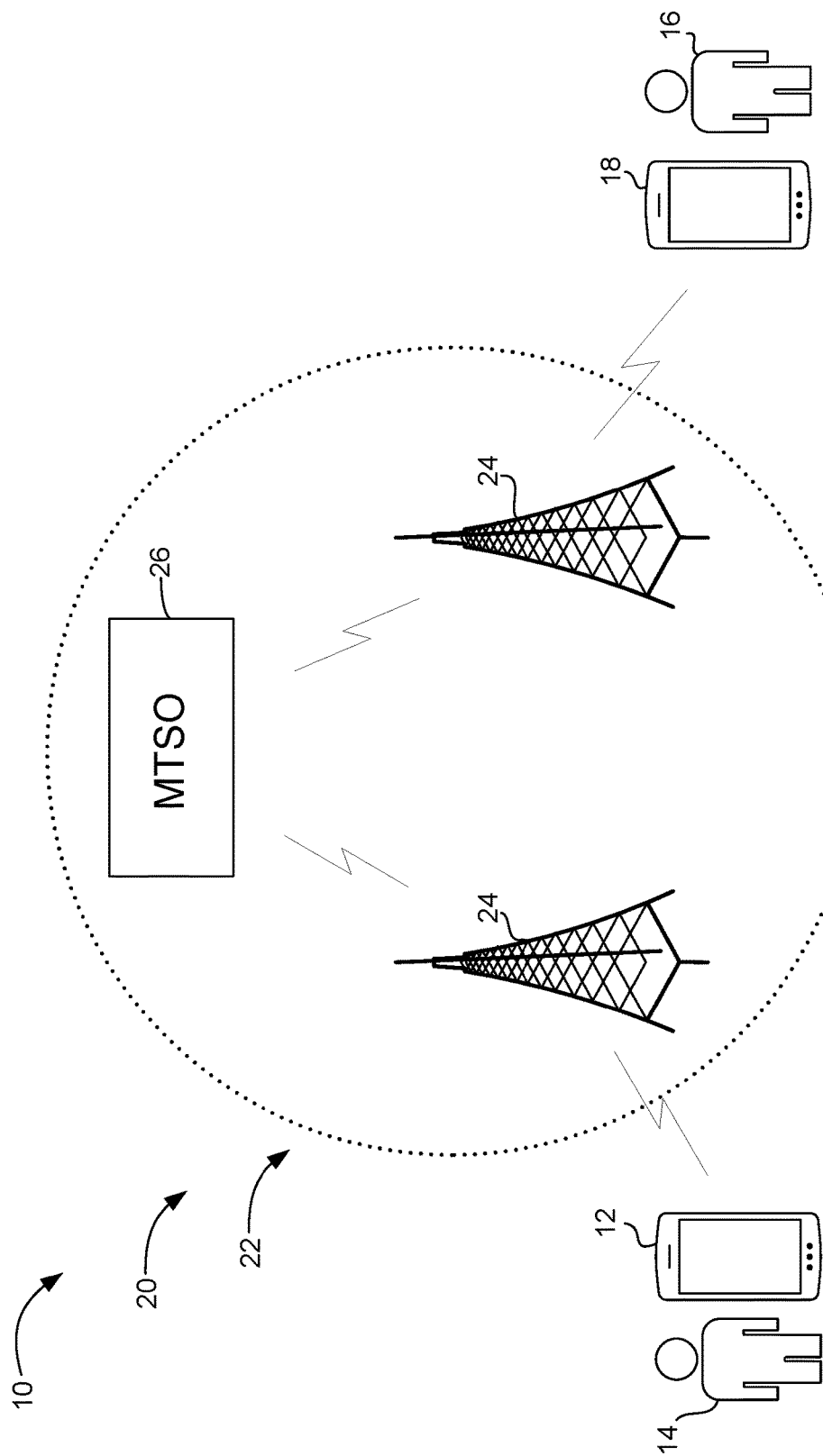
FIG. 1 is a schematic representation of a system for responding to battery power depletion in a first device of a first party during a communication with a second party, according to one embodiment.

Referring now to the drawings and with specific reference to FIG. 1, a communication system 10 that responds to battery power depletion of a first device 12 during a communication (e.g., a voice call, a video call, conference call, etc.) between at least a first party 14 using the first device 12 and a second party 16 using a second device 18 is shown. The first and second devices 12 and 18 may be various types of computer devices including personal computers and mobile devices such as mobile phones, smartphones, tablets, laptops, and wearable devices. For the sake of simplicity and clarity, the discussion focuses on the non-limiting example of two parties engaged in a voice call using their respective mobile devices, but it will be understood that additional parties may be involved in the communication, and/or other types of devices or other types of communications may apply in other embodiments.

The system 10 may further include a communication network 20 that establishes a communication link between the first device 12 and the second device 18 to allow the communication between the first party 14 and the second party 16 to take place. In one embodiment, the communication network 20 may be a mobile network 22 that includes one or more cell towers 24 in separate land areas or cells, and one or more central mobile telephone switching offices (MTSOs) 26 for coordinating communication between the cell towers 24 and tracking the location of the mobile devices 12 and 18. In alternative arrangements, the communication network 20 may be other types of networks such as WiFi networks or the Internet. As discussed more specifically below, the remaining battery power levels of either or both of the first device 12 and the second device 18 may be communicated to the communication network 20, allowing the network 20 to send notifications to the parties when one of the devices 12 or 18 is approaching a battery power loss, and/or to take measures to prevent call disconnection due to battery power loss.

Figure 2:
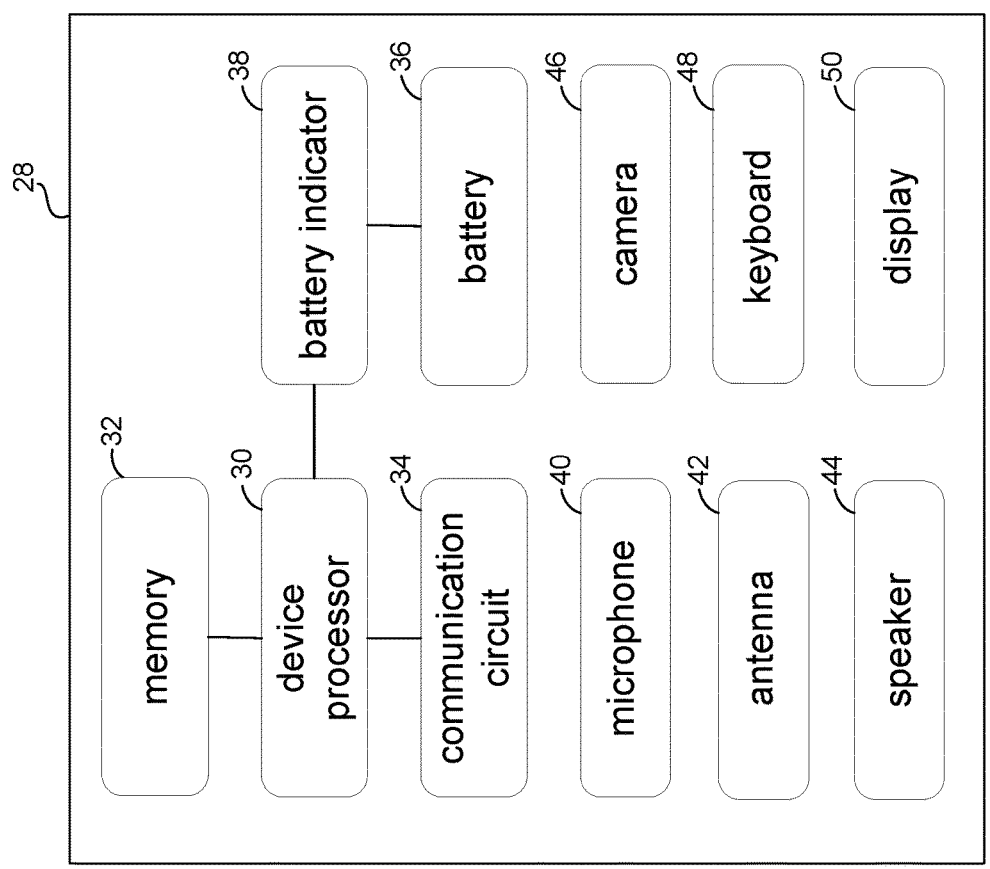
FIG. 2 is a schematic representation of certain components of the first device, according to one embodiment.

Turning to FIG. 2, certain components of a mobile device 28 representative of the first device 12 are shown. The second device 18 may have similar components. The mobile device 28 may include one or more device processors 30 configured to perform various functions and run applications on the device 28 according to computer-executable instructions, a memory 32 configured to store data and the computer-executable instructions used by the processor 30, and a communication circuit 34 involved in communication with the network 22. The mobile device 28 may further include a chargeable battery 36 for providing power to the device 28, and a battery indicator 38 in communication with the battery 36 for tracking the remaining battery power level. The battery indicator 38 may be in communication with the device processor 30, and may communicate the remaining battery power level to the processor 30. Other components of the mobile device 28 may include a microphone 40 and an antenna 42 that convert voice sounds into electromagnetic waves for transmission to a cell tower 24, and convert electromagnetic waves received from the cell tower 24 back into a sound that can be heard through a speaker 44. The device 28 may further include a camera 46, a keyboard 48, and a display 50. Many of the components of the device 28 may be supported on a printed circuit board.

Figure 3:
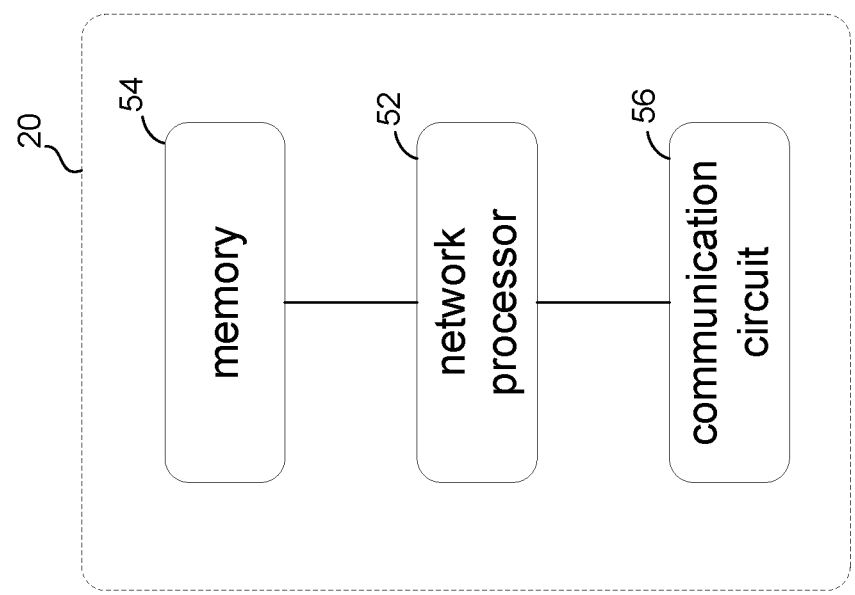
FIG. 3 is a schematic representation of certain components of a communication network, according to one embodiment.

Certain components of the communication network 20 are shown in FIG. 3. The network 20 may include one or more network processors 52 configured to perform certain functions of the network 20 according to computer-executable instructions. The network 20 may further include one or more memories 54 configured to store the computer-executable instructions, as well as information such as service plans, device locations, and user activity status. A communication circuit 56 may be in communication with the network processor 52, and may be involved in receiving and transmitting signals for controlling communication between the cell towers 24 and the devices 12 and 18. The communication circuit 56 may also be involved in communicating with other communication networks, such as the public switched telephone network.

Figure 4:
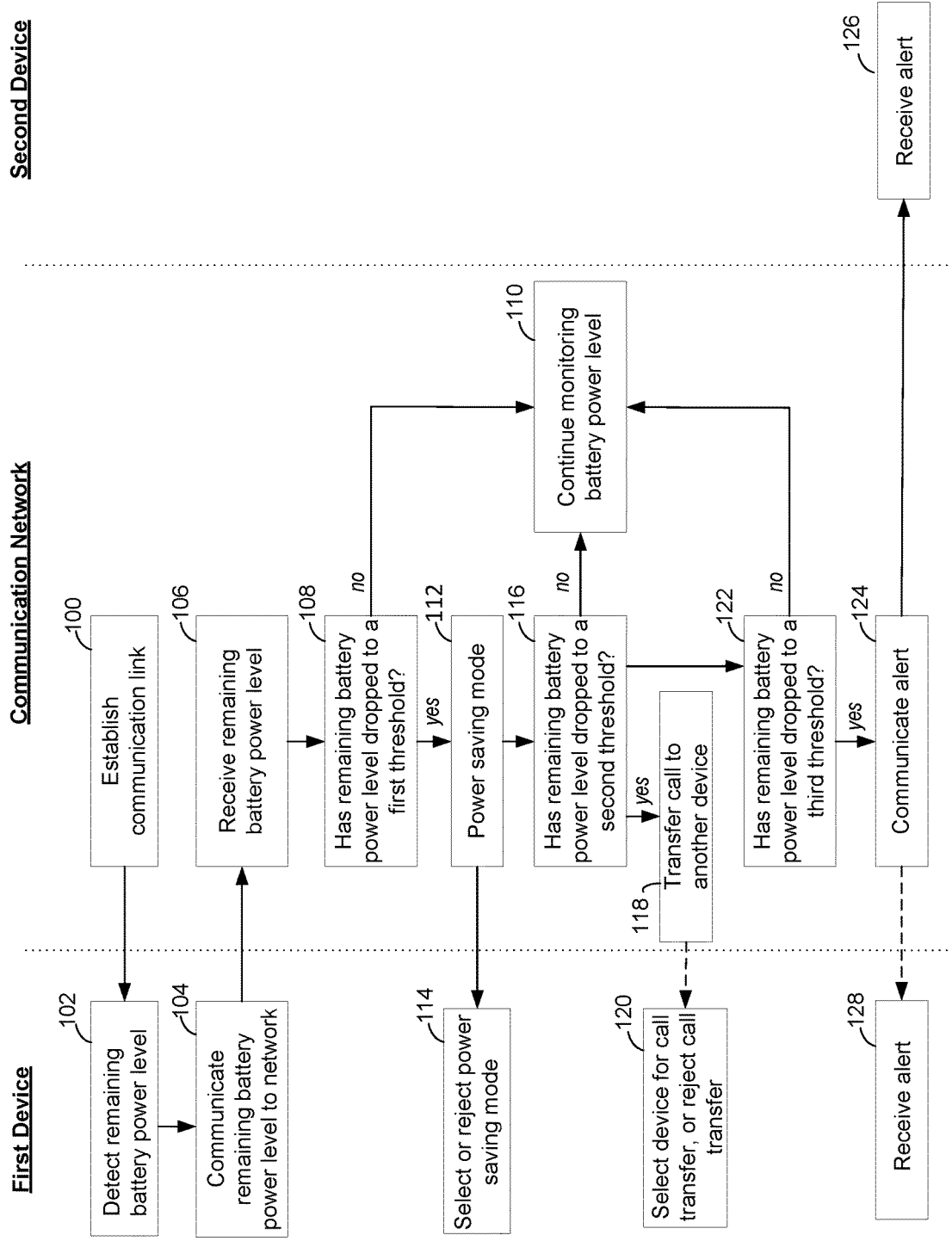
FIG. 4 is a flowchart illustrating a computer-implemented method for responding to battery power depletion in the first device during the communication, according to one embodiment.

Referring to FIG. 4, a method for responding to battery power depletion in the battery of the first device 12 during a call between the first party 14 and the second party 16 is shown. The steps of the method are organized according to those steps performed at the first device 12, those performed at the communication network 20, and those performed at the second device 18. The steps performed at the communication network 20 may be carried out by the network processor(s) 52. At a first block 100, the network 20 may establish a communication link between the first device 12 and the second device 18 to allow the call between the parties 14 and 16. During the call, the device processor 30 may receive signals from the battery indicator 38 indicating the remaining battery power level (block 102), and may communicate signals indicating the remaining battery power level to the network 20 (block 104). In some embodiments, the device processor 30 may communicate the remaining battery power level to the network 20 throughout the duration of the call, regardless of the quantity of remaining battery power. In other embodiments, the device processor 30 may only begin communicating the remaining battery power level to the network 20 after the remaining battery power level has dropped to a predetermined remaining battery power level (e.g., 50%, 40%, 20%, etc.). In one embodiment, the device processor 30 may communicate the remaining battery power level to the network 20 over the control channel through which the network 20 and the first device 12 use to set up the call, change channels, and exchange information regarding signal strength and signal quality. The control channel may be a channel separate from the communication link between the devices 12 and 18. The device processor 30 may communicate the remaining battery power level to the network 20 continuously, randomly, or periodically over predetermined time intervals or predetermined drops in the remaining battery power level.

The remaining battery power level may be communicated to a pre-established protocol such that the various elements of the network 20 will understand where to look for the remaining battery power indication in a communication. In some embodiments, the remaining battery power level may be a number between 0 and 100. In other embodiments, the remaining battery power level may be a less precise description. In some embodiments, the remaining battery power level is pushed from the first device 12. In other embodiments, the remaining battery power level may be pulled from the first device 12 by querying the first device 12. The query may use an application programming interface (API)

where a query is made and the remaining battery power level is returned according to a protocol.

The network 20 may receive the signals indicating the remaining battery power level at a block 106. At a block 108, the network 20 may determine whether the remaining battery power level has dropped to a first threshold which may be a predetermined percentage of remaining battery power (e.g., a threshold percentage of remaining battery power). If the remaining battery power level has not dropped to the first threshold, the network 20 may continue monitoring the battery power level according to signals received from the device processor 30 (block 110). If the remaining battery power level has dropped to the first threshold, the network may switch the first device 12 to power saving mode to conserve battery power (block 112). In one embodiment, the switch to power saving mode may be automatic. Alternatively, the first party 14 may be presented with an option to select or reject power saving mode at the display 50 (block 114). The power saving mode may involve switching the first device 12 to a less complex data modulation and coding scheme which consumes less battery power.

At a block 116, the network 20 may determine whether the remaining battery power level has dropped to a second threshold (e.g., a threshold percentage of remaining battery power) below the first threshold. If the remaining battery power level has not dropped to the second threshold, the network 20 may continue monitoring the battery power level according to signals received from the device processor 30 (block 110). If the remaining battery power level has dropped to the second threshold, the network 20 may transfer the call to another charged device of the first party 14 such that the call may continue without interruption (block 118). The call transfer may be automatic, and may be to a default device preselected by the first party 14. Alternatively, the first party 14 may be presented with options at the display 50 to select a device from a plurality of devices to which she or he wishes the call to be transferred to (block 120). The first party 14 may also reject call transfer, if desired. The call may be transferred to any device capable of continuing the call, such as another mobile device or a personal computer.

If the first party 14 rejects call transfer, or has not set up automatic call transfer, the call may continue between the first device 12 and the second device 18. At a block 122, the network 20 may determine whether the remaining battery power level of the first device 12 has dropped to a third threshold (e.g., a threshold percentage of remaining battery power) below the second threshold which indicates that the battery power level is critically low. If the remaining battery power level has not dropped to the third threshold, the network 20 may continue monitoring the battery power level according to signals received from the first device 12 (block 110). If the battery power level has dropped to the third threshold indicating that the first device 12 is on the verge of complete battery power loss, the network 20 may communicate an alert at least to the second device 18 to notify the second party 16 that the first device 12 is near a complete battery power loss that could terminate the call (block 124). The second device 18 may receive the alert from the network 20 at a block 126. The alert provides the second party 16 with adequate warning should the call be terminated, saving the party 16 from frustration associated with not knowing why the call was disconnected. The alert may also prevent the second party 16 from needlessly trying to call back the first party 14, and wasting network resources. The alert may be a voice message sent through the communication link to the second device 18 indicating that the battery power level of the first device 12 is critically low and that the call may be disconnected shortly. In other embodiments, the alert may be text message or an email sent from the network 20 to the second device 18.

As the network 20 is repeatedly apprised of the current battery power level of the first device 12, the network processor 52 may be able to distinguish between connectivity drops in the communication link that are caused by connectivity problems in the network 20, and those that are caused by battery power loss at the device level. For instance, if the network 20 receives signals indicating the battery power of the first device 12 is critically low, and the call disconnects shortly thereafter, the network 20 may determine that the reason for the disconnection is due to battery power loss only. Consequently, the network 20 may refrain from any wasting network resources required to optimize the communication link between the devices 12 and 18.

In some embodiments, the network may communicate an alert to the first device 12 as well when the battery power level is critically low (block 124), and the first device 12 may receive the alert at a block 128. The alerts may be communicated to the first and second devices 12 and 18 simultaneously or at different times. In other embodiments, only the second device 18 may receive an alert from the network 20.

Although the method of FIG. 4 is focused on the specific situation of battery power loss at the first device 12, it will be understood that the method is equally applicable to responding to battery power depletion at the second device 18. In some embodiments, the network 20 may monitor the battery power level of both devices 12 and 18 during the call, and respond to battery power level depletion at either device 12 or 18 as described above. Additionally, the first, second, and third thresholds at which the network 20 initiates power saving mode, call transfer, and alerts may vary depending on a number of factors such as user preferences, network preferences, and/or manufacturer preferences.

Figure 5:
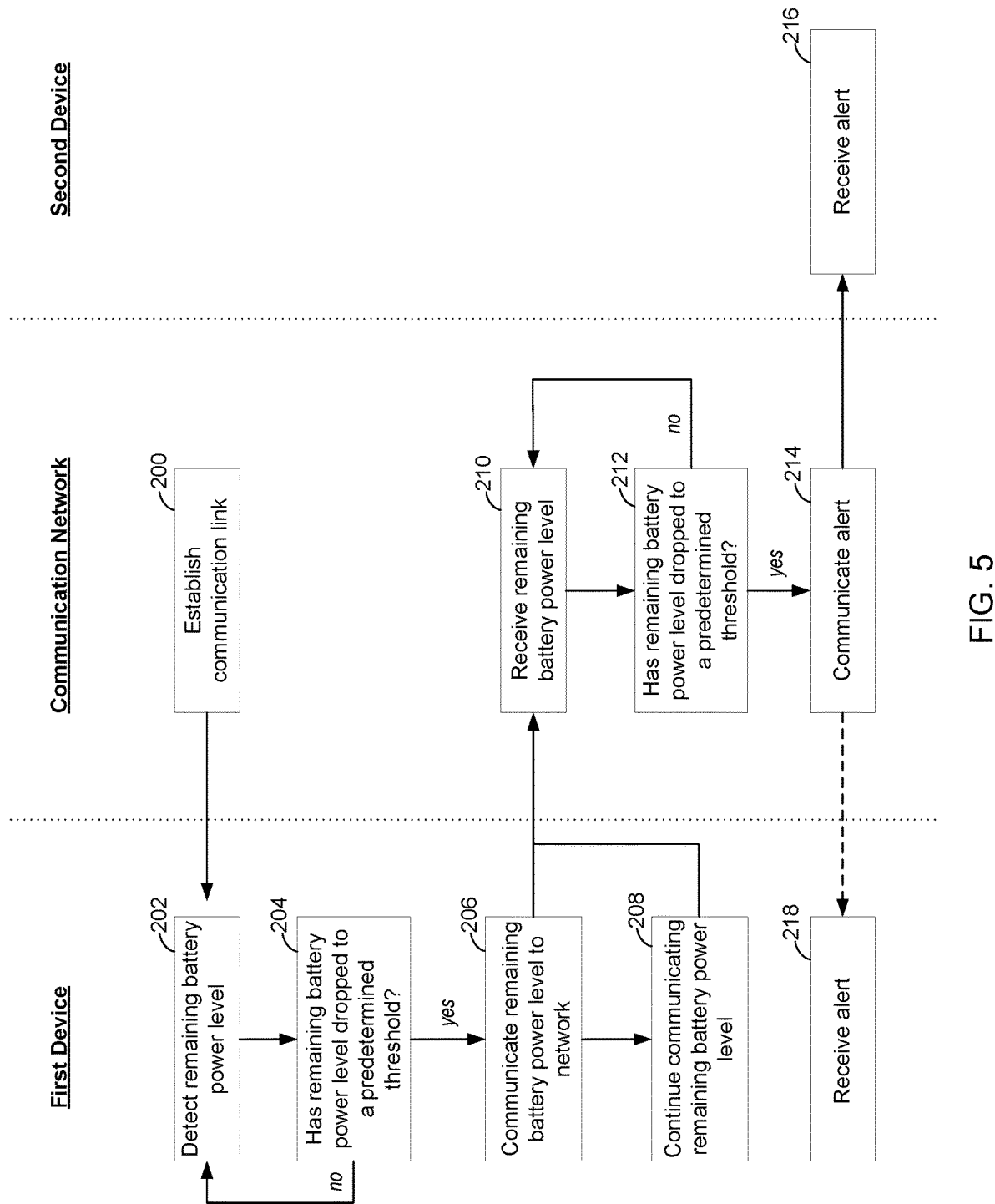
FIG. 5 is a flowchart illustrating a computer-implemented method for responding to battery power depletion in the first device during the communication, according to another embodiment.

Another method for responding to battery power depletion in the first device 12 during the communication is shown in FIG. 5. As above, the steps of the method are organized according to those steps performed at the first device 12, those performed at the network 20, and those performed at the second device 18. The steps performed at the communication network 20 may be carried out by the network processor(s) 52. It will be understood that the method of FIG. 5 is equally applicable to monitoring and responding to battery power depletion in the second device 18. After the communication link is established by the network 20 (block 200) and the call is in progress, the device processor 30 of the first device 12 may detect the remaining battery power level based on signals received from the battery indicator 38 (block 202). At a block 204, the device processor 30 may determine whether the battery power level has dropped to a predetermined threshold (e.g., predetermined percentage of remaining battery power) indicating that the first device 12 is approaching battery power loss. As non-limiting examples, the predetermined threshold may be 50% remaining battery power or less, or 20% remaining battery power or less. If the remaining battery power level has not dropped to the predetermined threshold, the first device 12 may continue detecting the remaining battery power level. Once the remaining battery power level has dropped to the predetermined threshold, the device processor 30 may begin communicating the remaining battery power level to the network 20 (block 206), and may continue communicating the remaining battery power level continuously, randomly, or periodically at predetermined time intervals or predetermined battery power level drops (block 208). The communication of the remaining battery power level may be through the control channel through which the first device 12 and the network 20 communicate with each other. In other embodiments, the device processor 30 may communicate the remaining battery power level to the network 20 regardless of the quantity of remaining battery power.

The network 20 may begin receiving signals indicating the remaining battery power level of the first device 12 once the remaining battery power level has dropped to the first predetermined threshold (block 210), and may continue to receive signals from the device processor 30 updating the remaining battery power level continuously, randomly, or periodically thereafter. The network 20 may evaluate the remaining battery power level to determine whether the remaining battery power level has dropped to a predetermined threshold (block 212). The predetermined threshold may be a remaining battery power level indicating that the first device 12 is near a battery power loss. As non-limiting examples, the predetermined threshold may be a remaining battery power percentage ranging from 1% to 10%. If the remaining battery power level has not dropped to the predetermined threshold, the network 20 may continue to monitor the remaining battery power level according to signals received from the first device 12 (block 210). If the remaining battery power level has dropped to the predetermined threshold, the network 20 may communicate the alert to the second device 18 (blocks 214 and 216) to alert the second party 16 of an impending call termination due to battery power loss at the first device 12. Optionally, the alert may be communicated to the first device 12 as well (blocks 214 and 218), simultaneously or at a different time.

The various thresholds including the threshold at which the first device 12 begins communicating the remaining battery power level to the network 20, the frequency at which the remaining battery power level is communicated to the network 20, the threshold that triggers the network 20 to communicate the alert, and the thresholds at which the network 20 initiates the power saving mode or call transfer to another device may be configurable or customizable according to preferences of the user, the network 20, and/or the manufacturer of the mobile device or the battery. In some embodiments, the system 10 may include an application that is downloadable on the first device 12 allowing the user to customize settings such as device preferences for automatic and selected call transfer, power saving mode settings, and battery percentage thresholds for initiating power saving mode, call transfer, and communication of alerts.

In some embodiments, the thresholds may be modified by monitoring past battery performance of the mobile device. For example, as the mobile device grows older, the battery life may become less linear and significant drops in battery life may occur very quickly. In addition, the battery power level may drop based on the applications currently active on the first device 12. For example, the battery power level may drop from 40% to 5% in under a minute if battery heavy applications are operating. By monitoring the various applications that are active on the first device 12 and the resulting battery depletion over time, better predictions may be made about the remaining battery power level and the communicated remaining battery power level may be more useful as a warning in situations where a rapid battery drop is likely. In some situations, the battery life of devices may be used to predict the battery life of the device in question.

In yet another embodiment, the type of indication communicated may relate to the remaining battery power level. For example, an initial remaining battery power level of 10% may be in an unobtrusive communication whereas a later remaining battery power level of 2% may be communicated in a more intrusive manner, such as with a sound or a larger display on the second device 18. The first party 14 having the first device 12 may be able to select and modify the urgency indicated in the warning communicated to the second device 18.

In some additional embodiments, the remaining battery power level may be translated into a remaining time left. The translation may be made from estimates of past phone or device battery drainage or from the battery drainage of similar phones or devices using similar applications. The first party 14 having the first device 12 may select to communicate the estimated remaining time or the estimated remaining battery power level. Similarly, the remaining time may be selected to be communicated by the first party 14, and the type and urgency of the communication may be selected by the first party 14.

In some additional embodiments, the second party 16 may be able to select to minimize, maximize, or block the remaining battery life or remaining time communications. In some instances, the second party 16 may not wish to be bothered by the communications from the first party 14, or may not wish to be aggressively notified of such communications. The second party 16 may have an application that may be adjusted according to the preferences of the second party 16.

Figure 6:
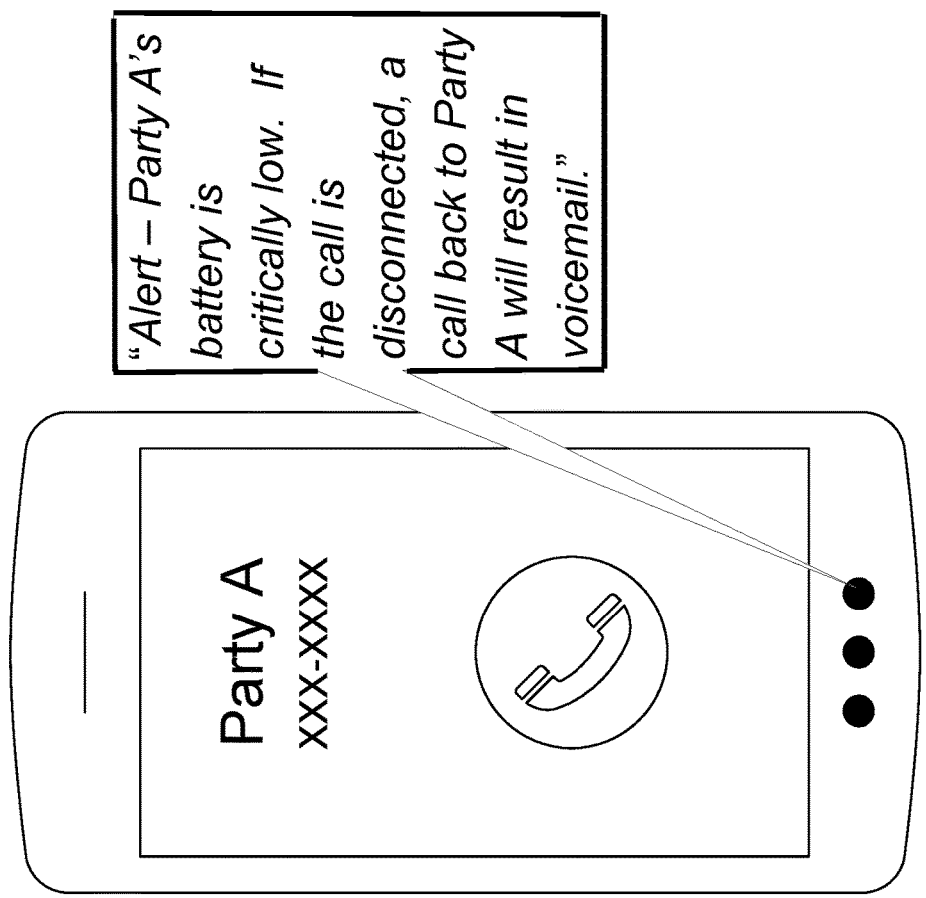
FIG. 6 is a schematic representation of an alert provided at a second device of the second party when the battery power level of the first device is critically low, according to one embodiment.
Figure 7:
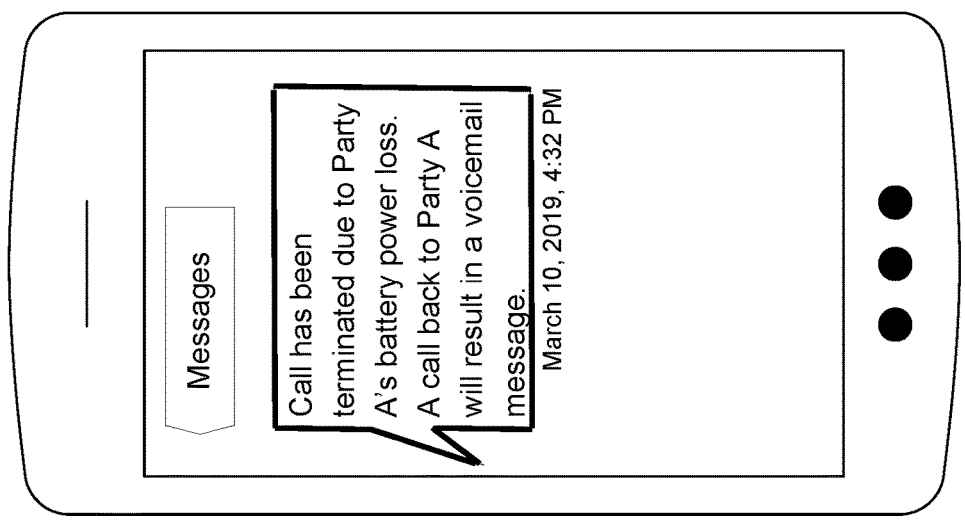
FIG. 7 is a schematic representation of notifications provided at the second device of the second party when the battery power level of the first device is depleted, according to one embodiment.

FIG. 6 depicts an exemplary alert that may delivered to the second device 18 to notify the second party 16 that the other party's device battery power is critically low. The alert may include an notification that a call back to the other party will result in a voicemail message should the call be disconnected. The alert may be an automated voice message from the network 20 over the communication link used to establish the call. In alternative embodiments, the alert may be delivered to the second device 18 as a text or an email. In some embodiments, the network 20 may deliver an alert to the second party 16 after the termination of the call indicating a call back to the first party's device 12 will result in voicemail. For instance, the alert may be delivered to the second device as a text message (FIG. 7), an email, or other type of communication. It will be understood that the alerts of FIGS. 6-7 are exemplary and may include other or additional notifications, or may have a different appearance in practice.

In certain situations, the first party 14 may wish to push a communication indicating a remaining battery power level to the second party 16. An application on the first device 12 may allow the first party 14 to select to communicate an indication of the remaining battery power level to the second party 16. Similarly, in some embodiments, the first party 14 may be able to select to not communicate the remaining battery power level from the first device 12 to the second device 18. In some additional embodiments, the first party 14 may be able to adjust the remaining battery power level that is communicated from the first device 12 to the second device 18. Related, if the first party 14 connects the first device 12 to an external power source such as a charging cord, the communication of the remaining battery power level may be suspended. Further, the fact that an external power source has been connected to the first device 12 may be communicated to the second device 18 if selected by the first party 14.

The present disclosure provides a solution to the need for providing alerts or notifications to a second party on a call when the other party is about to experience or has experienced a battery power loss at their device. If the call is subsequently disconnected, the second party will know to refrain from calling the other party back on the same device, saving network resources. The alert also provides the parties with an opportunity minimize disruption of the conversation by quickly setting up an alternate communication method before the call is disconnected. Furthermore, as the network is apprised of the current battery power level of at least one party's device during the call, the network avoids unnecessary optimizations to restore the connection when the device loses battery power.

What is claimed is:

1. A computer-implemented method for responding to battery power depletion on a first device of a first party during a communication between the first party using the first device and a second party using a second device, comprising:
   detecting a remaining battery power level of the first device using a battery indicator on the first device;
   communicating, from the first device, the remaining battery power level to a communication network at least partially controlling the communication between the first party and the second party;
   initiating, at the communication network, a first response when the remaining battery power level has dropped to a first threshold, the first response being switching the first device to power saving mode or providing the first party with an option to switch the first device to the power saving mode;
   initiating, at the communication network, a second response when the remaining battery power level has dropped to a second threshold below the first threshold, wherein the second response is providing the first party with an option to transfer the communication to another device of the first party;
   determining whether the remaining battery power level of the first device is near battery power loss; and
   communicating, from the communication network, an alert to the second device to notify the second party that the first device is near the battery power loss.

2. The computer-implemented method of claim 1, wherein communicating the alert comprises communicating the alert to the second device as a voice message.

3. The computer-implemented method of claim 1, wherein communicating the alert comprises communicating the alert to the second device as a visual message or a text message.

4. The computer-implemented method of claim 1, wherein the communication is a call between the first party and the second party, and wherein communicating the alert further comprises communicating a message to the second device that a call back to the first device will result in a voicemail message from the first device.

5. The computer-implemented method of claim 1, wherein the second response is transferring the communication to another device of the first party.

6. The computer-implemented method of claim 5, further comprising initiating, at the communication network, a third response when the remaining battery power level has dropped to a third threshold below the second threshold, wherein the third threshold indicates that the remaining battery power level is near the battery power loss, and wherein the third response is communicating the alert to the second device.

7. A communication system, comprising:
   a first device of a first party, the first device including at least a battery, a battery indicator configured to detect a remaining battery power level of the battery, a device processor, a memory, and a communication circuit;
   a second device of a second party; and
   a communication network configured to establish a communication link between the first device and the second device that allows a communication between the first party and the second party, the communication network including at least a network processor, a memory, and a communication circuit;
   wherein the device processor of the first device is physically configured according to computer-executable instructions for:
      receiving a signal from the battery indicator indicating a remaining battery power level of the battery, and
      communicating a signal indicating the remaining battery power level to the communication network during the communication between the first party and the second party; and
   wherein the network processor of the communication network is physically configured according to computer-executable instructions for:
      receiving the signal indicating the remaining battery power level of the first device from the device processor,
      determining whether the remaining battery power level of the first device is near battery power loss, and
      communicating an alert to the second device to notify the second party that the first device is near the battery power loss prior to termination of the communication.

8. The communication system of claim 7, wherein the alert to the second device is a voice message.

9. The communication system of claim 7, wherein the communication is a call between the first device and the second device, and wherein the alert includes a message that a call back to the first device will result in a voicemail message from the first device.

10. The communication system of claim 7, wherein the device processor of the first device is configured to communicate the remaining battery power level to the communication network periodically after the remaining battery power level has dropped below a predetermined threshold.

11. The communication system of claim 7, wherein the network processor is further configured according to computer-executable instructions for communicating an alert to the first device to notify the first party that the first device is near the battery power loss, simultaneously with communicating the alert to the second device.

12. The communication system of claim 7, wherein the network processor is further configured according to computer-executable instructions for initiating a first response when the remaining battery power level has dropped to a first threshold, wherein the first response is switching the first device to a power saving mode.

13. The communication system of claim 12, wherein the network processor is further configured according to computer-executable instructions for initiating a second response when the remaining battery power level has dropped to a second threshold below the first threshold, wherein the second response is transferring the communication to another device of the first party.

14. The communication system of claim 13, wherein the network processor is further configured according to computer-executable instructions for initiating a third response when the remaining battery power level has dropped to a third threshold below the second threshold, wherein the third threshold indicates that the remaining battery power level is near the battery power loss, and wherein the third response is communicating the alert to the second device.

15. The communication system of claim 7, wherein the network processor is further configured according to computer-executable instructions for diagnosing a cause for a sudden disconnection of the communication as the battery power loss based on the signal indicating the remaining battery power level.

16. A computer-implemented method for responding to battery power depletion on a first device of a first user during a call between the first device and a second device of a second user, comprising:

establishing, via a communication network, a communication link between the first device and the second device that allows the call between the first device and the second device;

receiving, at the communication network, a signal from the first device indicating the remaining battery power level during the call between the first device and the second device;

determining, at the communication network, whether the remaining battery power level of the first device is near battery power loss based on the signal; and communicating an alert from the communication network to the second device indicating that the first device is near the battery power loss; and transferring the communication link between the first device and the second device to another device of the first party.

17. The computer-implemented method of claim 16, wherein the call is one of a voice call, a video call, and a conference call.

18. The computer-implemented method of claim 17, wherein the first device and the second device are each one of a mobile phone, a tablet, a laptop, and a personal computer.

19. The computer-implemented method of claim 16, further comprising diagnosing, at the communication network, a cause for a sudden loss in connectivity for the call as the battery power loss based on the signal indicating the remaining battery power level.

* * * * *